US012070954B2

(12) United States Patent
Ogura et al.

(10) Patent No.: US 12,070,954 B2
(45) Date of Patent: Aug. 27, 2024

(54) LIQUID HOUSING CONTAINER AND LIQUID EJECTION DEVICE

(71) Applicant: CANON KABUSHIKI KAISHA, Tokyo (JP)

(72) Inventors: Mika Ogura, Kanagawa (JP); Masatoshi Ohira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 17/722,157

(22) Filed: Apr. 15, 2022

(65) Prior Publication Data

US 2022/0348020 A1 Nov. 3, 2022

(30) Foreign Application Priority Data

Apr. 28, 2021 (JP) ................................ 2021-076057

(51) Int. Cl.
*B41J 2/175* (2006.01)

(52) U.S. Cl.
CPC ......... *B41J 2/1754* (2013.01); *B41J 2/17509* (2013.01); *B41J 2/17553* (2013.01)

(58) Field of Classification Search
CPC .. B41J 2/1754; B41J 2/17509; B41J 2/17553; B41J 2/17523; B41J 29/13; B41J 2/175; B41J 2/17503; B41J 2/17513
USPC ........................................................ 347/86
See application file for complete search history.

(56) References Cited

U.S. PATENT DOCUMENTS 5,506,611 A 4/1996 Ujita et al. ................. B41J 2/01
5,949,456 A 9/1999 Matsumoto et al. .... B41J 2/175
8,454,139 B2 6/2013 Ishizawa et al. ........ B41J 2/175
9,662,895 B1 5/2017 Okuno ....................... B41J 2/15
9,914,305 B2 3/2018 Orihara et al. ...... B41J 2/17503
10,093,105 B2 10/2018 Shimamura et al. ........................ B41J 2/17553
10,112,403 B2 10/2018 Ikebe et al. .......... B41J 2/17553
10,399,346 B2 9/2019 Arai et al. ............... B41J 2/175
(Continued)

FOREIGN PATENT DOCUMENTS

CN 1139621 1/1997
CN 1161280 10/1997
(Continued)

OTHER PUBLICATIONS

US 5,874,977 A, 02/1999, Ishinaga et al. (withdrawn)
(Continued)

*Primary Examiner* — Jason S Uhlenhake
*Assistant Examiner* — Alexander D Shenderov
(74) *Attorney, Agent, or Firm* — Venable LLP

(57) ABSTRACT

A liquid housing container includes a container main body including a housing chamber for housing liquid therein; and a feeding port for feeding the liquid to the housing chamber, and a plug member that is attachable to and detachable from the container main body and seals the feeding port, the plug member including a cover portion for covering the feeding port from an outer side of the container main body in a mounting state, in which the plug member is mounted to the container main body, and a protruded portion that protrudes from the cover portion to an inner side of the feeding port. The protruded portion includes a liquid holding portion that is provided at a position including a distal end surface of the protruded portion and is capable of holding the liquid by capillary force.

16 Claims, 13 Drawing Sheets

(56) References Cited

U.S. PATENT DOCUMENTS

| | | | | |
|---|---|---|---|---|
| 10,399,347 | B2 | 9/2019 | Miyashita et al. | B41J 2/17506 |
| 10,427,412 | B2 | 10/2019 | Okude et al. | B41J 2/03 |
| 10,538,092 | B2 | 1/2020 | Miyashita et al. | B41J 2/17523 |
| 10,611,162 | B2 | 4/2020 | Ikebe et al. | B41J 2/1752 |
| 10,618,300 | B2 | 4/2020 | Shimamura et al. | B41J 2/17553 |
| 10,843,474 | B2 | 11/2020 | Arai et al. | B41J 29/13 |
| 11,192,383 | B2 | 12/2021 | Shimamura et al. | B41J 2/17553 |
| 2017/0246874 | A1* | 8/2017 | Shirono | B41J 2/17513 |
| 2017/0305164 | A1* | 10/2017 | Orihara | B41J 2/17503 |
| 2018/0297367 | A1 | 10/2018 | Shirono | B41J 2/175 |
| 2022/0048295 | A1 | 2/2022 | Shimamura et al. | B41J 29/13 |

FOREIGN PATENT DOCUMENTS

| | | | |
|---|---|---|---|
| CN | 1491798 | 4/2004 | |
| EP | 0419189 | 3/1991 | |
| EP | 0864428 | 9/1998 | |
| JP | 2012/020497 | 2/2012 | B41J 2/175 |

OTHER PUBLICATIONS

U.S. Appl. No. 17/716,870, filed Apr. 8, 2022.

Office Action dated May 9, 2024 in counterpart Chinese Application No. 202210436466.0, together with English translation thereof.

* cited by examiner

LIQUID HOUSING CONTAINER AND LIQUID EJECTION DEVICE

BACKGROUND OF THE INVENTION

Field of the Invention

The present invention relates to a liquid housing container capable of housing liquid therein and a liquid ejection device including the liquid housing container.

Description of the Related Art

Recent liquid ejection devices generally include a liquid ejection head for ejecting liquid, such as liquid, and a liquid housing container for storing liquid supplied to the liquid ejection head. Liquid in the liquid housing container is supplied to the liquid ejection head through a tube or a liquid flow path.

Japanese Patent Application Publication No. 2012-20497 discloses, unlike the above-mentioned liquid ejection device for supplying liquid from a liquid housing container to a liquid ejection head through a tube or a liquid flow path, a liquid ejection device for injecting liquid to a liquid ejection head from an injection port provided in a large-capacity liquid housing container.

The liquid housing container disclosed in Japanese Patent Application Publication No. 2012-20497 includes an injection port for injecting liquid and a plug member for preventing leakage of liquid from the injection port. The plug member is structured to be attachable to and detachable from the injection port. When liquid is injected, the plug member is detached from the injection port, and in other cases, the plug member is mounted to the injection port in order to prevent liquid from leaking to the outside.

In the case of injecting liquid to the liquid housing container, liquid may be attached to the vicinity of the injection port included in the liquid housing container. If the plug member is mounted to the injection port in a state in which liquid is attached to the vicinity of the injection port, the plug member may be contaminated and damaged by the liquid attached to the vicinity of the injection port. When the liquid ejection device is moved in the state in which liquid is stored in the liquid housing container, the liquid in the liquid housing container may be attached to the plug member due to the swinging of the liquid.

The plug member is press-fitted and mounted to the injection port of the liquid housing container. To detach the plug member, force against friction force acting on a part of the press-fitted plug member is applied to the plug member. Thus, liquid attached to the plug member may be scattered to the outside due to shock when the plug member is detached from the injection port. After the opening, the liquid attached to the plug member may be attached to the hand of a user.

SUMMARY OF THE INVENTION

The present invention has been made in view of the above-mentioned problems, and an object thereof is to provide a liquid housing container including a plug member that is capable of reducing the possibilities of scattering of liquid and contamination of human hands during opening of a plug member.

According to an aspect of the present disclosure, it is provided a liquid housing container including a container main body including a housing chamber for housing liquid therein; and a feeding port for feeding the liquid to the housing chamber; and a plug member that is attachable to and detachable from the container main body and seals the feeding port, the plug member including a cover portion for covering the feeding port from an outer side of the container main body in a mounting state, in which the plug member is mounted to the container main body, and a protruded portion that protrudes from the cover portion to an inner side of the feeding port, wherein the protruded portion includes a liquid holding portion that is provided at a position including a distal end surface of the protruded portion and is capable of holding the liquid by capillary force.

In addition, according to an aspect of the present disclosure, it is provided a liquid ejection device including a liquid ejection head for ejecting liquid, the liquid housing container as described above.

Further features of the present invention will become apparent from the following description of exemplary embodiments with reference to the attached drawings.

DESCRIPTION OF THE EMBODIMENTS

Preferred embodiments of the disclosed technology are described below with reference to the drawings. The dimensions, materials, shapes, and relative arrangement of components described below are subject to change as appropriate depending on configurations of a device to which the invention is applied and various conditions. Thus, the scope of the invention is not intended to be limited to the following description. Well-known technologies or publicly known technologies in the technical field can be applied to configurations and steps that are not particularly illustrated or described. Overlapping descriptions are sometimes omitted.

First Embodiment

Figure 1:
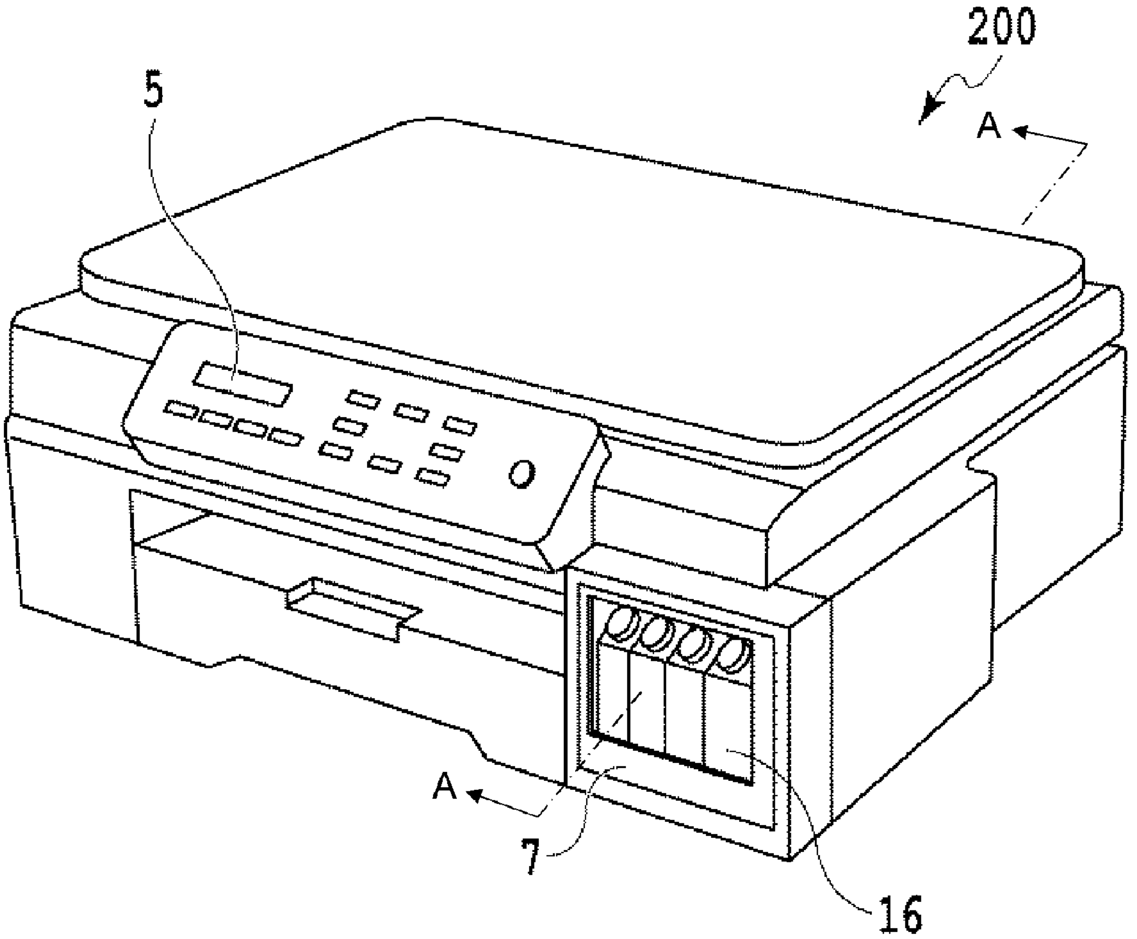
FIG. 1 is a perspective view illustrating a mechanical section in a liquid ejection device according to a first embodiment.
Figure 2:
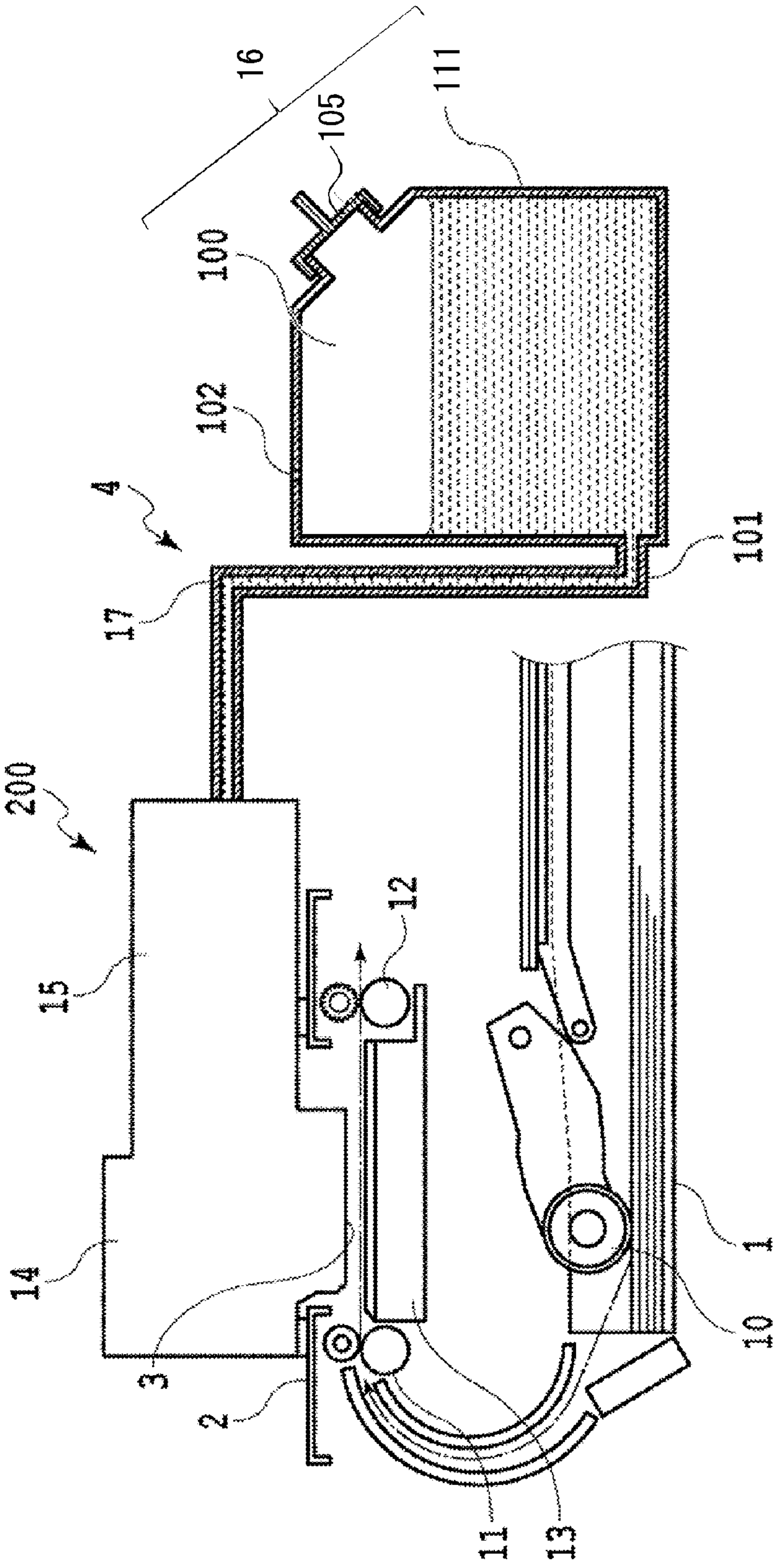
FIG. 2 is a view illustrating a cross section of the liquid ejection device according to the first embodiment.

Referring to the drawings, a first embodiment of the present invention is described below. FIG. 1 is a perspective view illustrating a mechanical section of a liquid ejection device 200 to which the present embodiment can be applied. FIG. 2 is a view illustrating a cross section of the liquid ejection device 200 taken along the line A-A in FIG. 1. Note that, in FIG. 2, the size of each member is changed or a member is omitted for the sake of description.

The liquid ejection device 200 includes a feed unit 1, a transport unit 2, an ejection unit 3, a supply portion 4, and a display unit 5. The feed unit 1 uses the feed roller 10 to separate print media one by one from a bundle of sheet-shaped print media and supply the print medium to the transport unit 2. The transport unit 2 is provided on the downstream side of the feed unit 1 in the transport direction, and includes a platen 13 for holding a print medium between the transport roller 11 and the discharge roller 12. The transport unit 2 transports the print medium fed from the feed roller 10 by using the transport roller 11 and the discharge roller 12.

The ejection unit 3 ejects liquid to a print medium by the liquid ejection head 15 mounted to the carriage 14. The print medium transported by the transport unit 2 is supported by the platen 13 from the vertically lower side. By ejecting liquid from the liquid ejection head 15 located at the vertically upper part, an image based on image information is formed. The liquid housing container 16 can store liquid therein, and the supply portion 4 is configured to supply liquid from a housing chamber (storage chamber) 100 in the container main body 111 to the liquid ejection head 15 through a flow path 101 and a flexible supply tube 17.

In the present embodiment, liquid is ink, and specifically, four supply tubes 17 through which ink of colors (black, magenta, cyan, and yellow) circulate are extended from the liquid housing container 16, and are connected to the liquid ejection head 15 in the bundled state.

When liquid supplied to the liquid ejection head 15 is ejected from an ejection port of the liquid ejection head 15, liquid with the same amount as the amount of the ejected liquid is supplied to the liquid ejection head 15 from the liquid housing container 16. In the liquid housing container 16, air with the same amount as the amount of liquid supplied to the liquid ejection head 15 flows from an atmospheric communication port 102 provided at the upper part of the container main body 111 in the vertical direction. The display unit 5 is used to notify a user of the state of the device in operation and display information for operation selection by the user.

Figure 3:
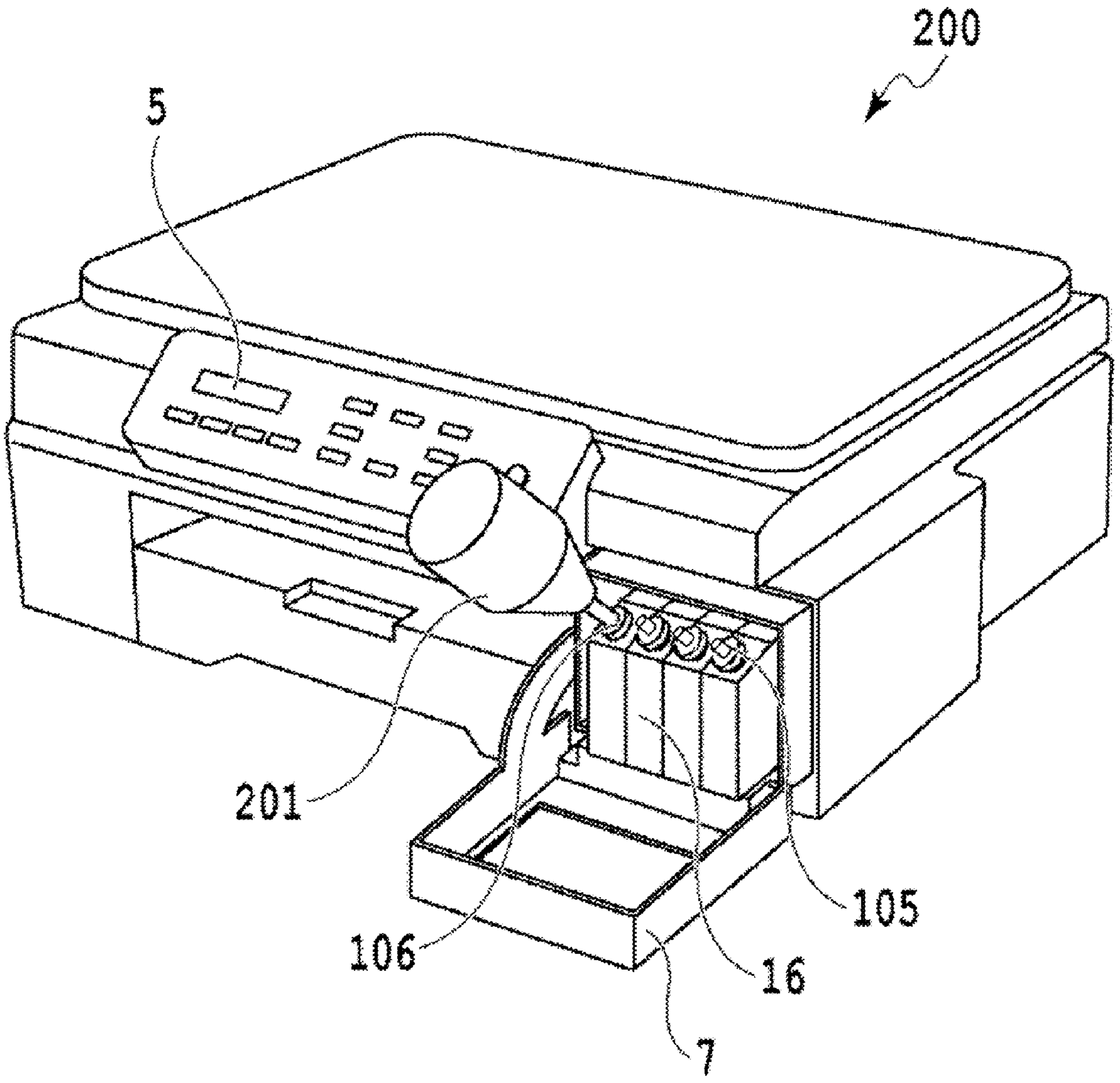
FIG. 3 is a perspective view illustrating a liquid ejection device in which liquid is replenished in the first embodiment.

FIG. 3 is a perspective view illustrating the liquid ejection device 200 when liquid is replenished from the liquid replenishment container 201. As illustrated in FIG. 3, in the liquid ejection device 200 in the present embodiment, in order to supply liquid, a user opens the container cover 7 to supply liquid to the inside of the housing chamber 100 from the liquid replenishment container 201 through a feeding port 106 included in the liquid housing container 16. The feeding port 106 is provided with a plug member 105 that is removably attached to the container main body 111 and seals the feeding port 106, and when liquid is replenished by the liquid replenishment container 201, a user detaches the plug member 105 of the feeding port 106. Note that the liquid housing container 16 is not limited to the state of being incorporated in the device main body of the liquid ejection device 200 as in the present embodiment. The liquid housing container 16 may be provided outside of the main body of the liquid ejection device 200 as long as liquid can be supplied from the liquid housing container 16 to the liquid ejection head 15. The plug portion 105 corresponds to a protruded portion that protrudes from the cover portion of the plug member to the inner side of the feeding port.

Figure 4:
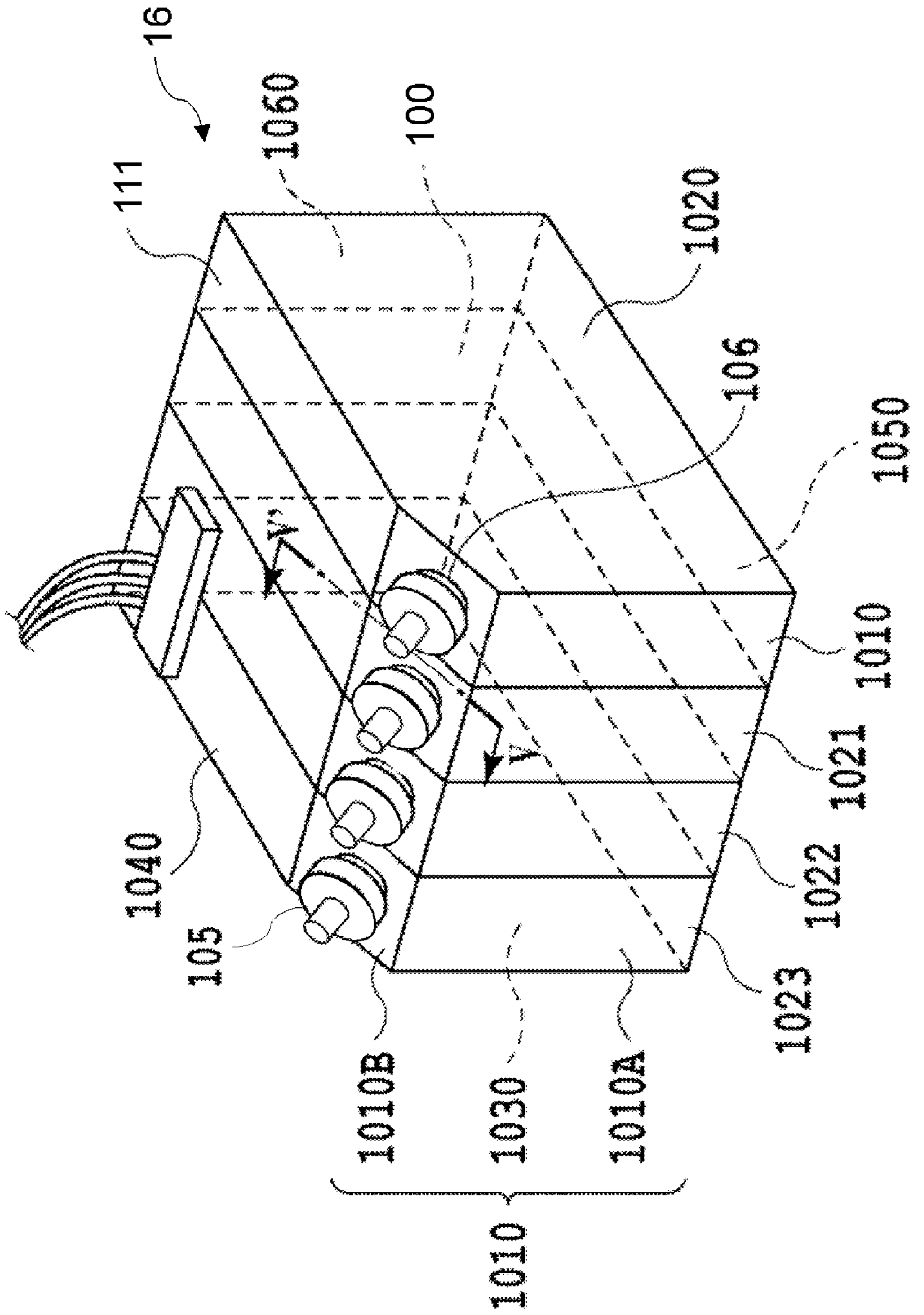
FIG. 4 is a perspective view illustrating a liquid housing container in the liquid ejection device according to the first embodiment.

FIG. 4 is a perspective view illustrating the liquid housing container 16 in the liquid ejection device 200. The liquid housing container 16 in the present embodiment is configured by a container main body 111 including the housing chamber 100 and the feeding port 106, and a plug member 105. The container main body 111 is molded by synthetic resin such as polypropylene, and has an outer shape of a substantially rectangular parallelepiped. The container main body 111 has a front wall 1010, a right wall 1020, a left wall 1030, a top wall 1040, and a bottom wall 1050. The front wall 1010 is configured by an erected wall 1010A extending from the bottom wall 1050 substantially in the up-down direction, and an inclined wall 1010B (example of outer wall) connected to an upper end of the erected wall 1010A and inclined with respect to the up-down direction and the front-back direction. The inclined wall 1010B is inclined to the rear side with respect to the erected wall 1010A, and a feeding port 106 for liquid is formed in the inclined wall 1010B.

On the other hand, the rear surface of the container main body 111 is opened. A film 1060 is welded to the rear end portions of the right wall 1020, the left wall 1030, the color separation walls 1021, 1022, and 1023, the top wall 1040, and the bottom wall 1050, so that the container main body 111 is sealed to form a rear wall serving as the rear surface. In other words, the rear wall of the container main body 111 is formed by the film 1060. As a result of the above-mentioned configuration, the housing chamber 100 for housing liquid therein is formed.

Figure 5:
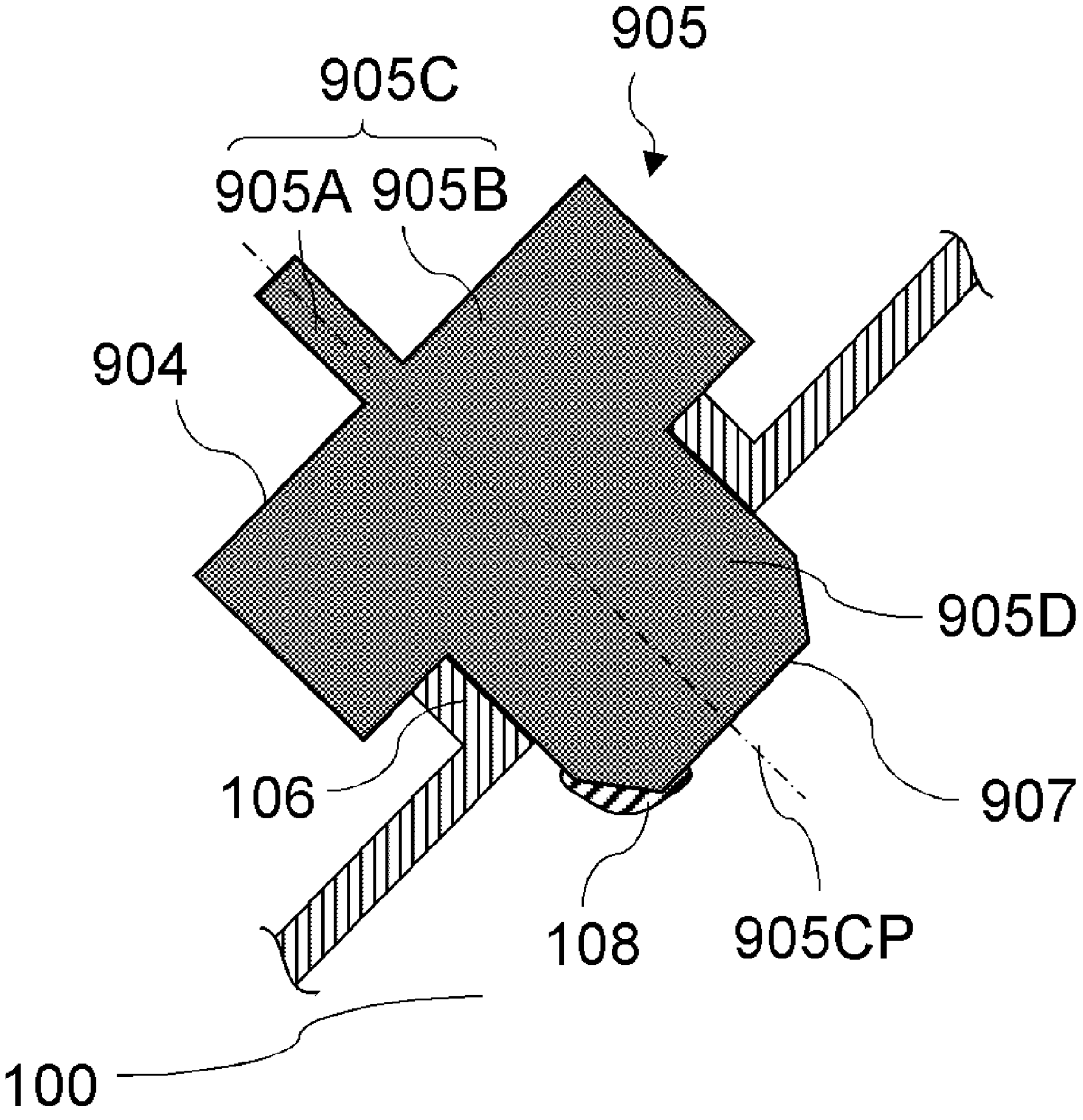
FIG. 5 is a cross-sectional view illustrating a plug member in a comparative example.
Figure 6B:
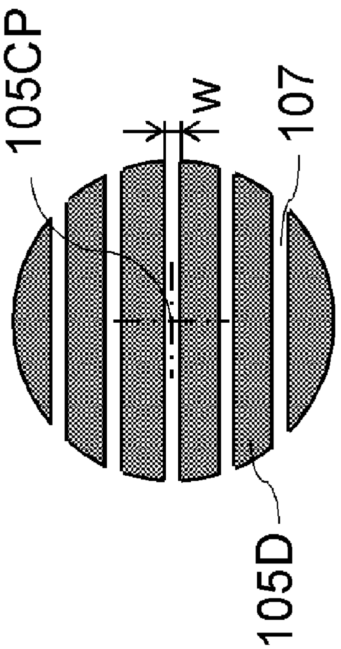
FIG. 6B is a top view illustrating an example of the plug member according to the first embodiment.
Figure 6A:
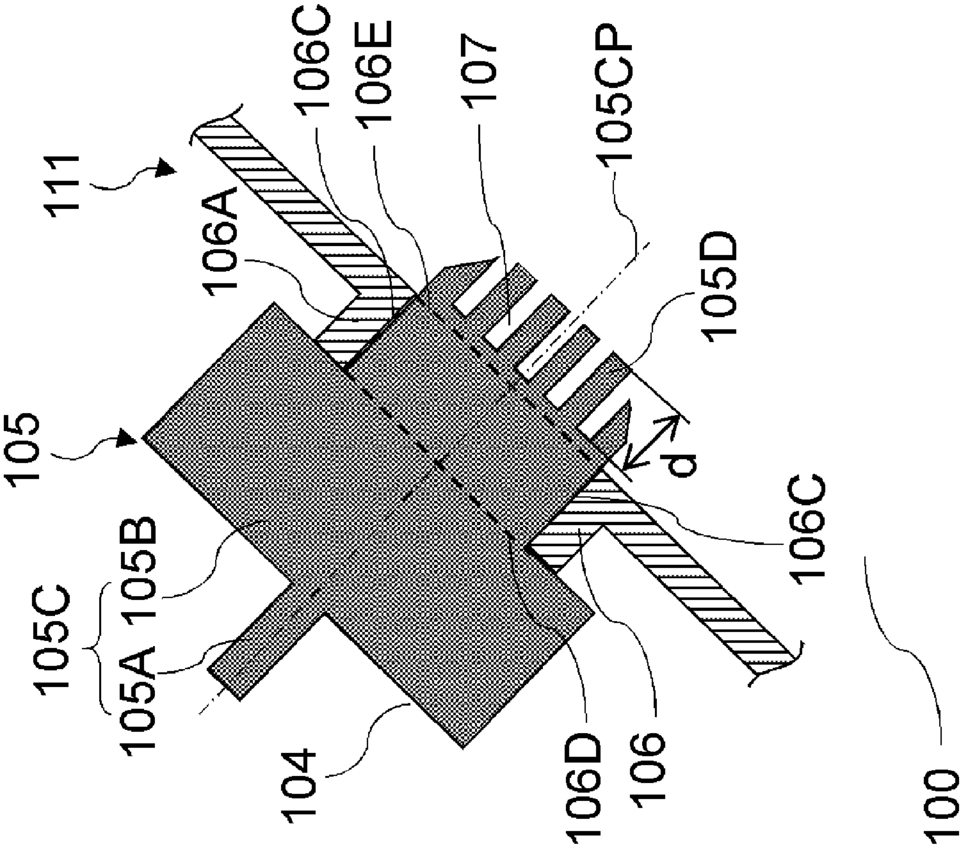
FIG. 6A is a cross-sectional view illustrating an example of a plug member according to the first embodiment.

FIG. 5 is a view illustrating a cross section of a plug member 905 in a comparative example, and FIG. 6A is a view illustrating a cross section of the plug member 105 in the present embodiment. Note that FIG. 6A is a cross-sectional view of the plug member 105 taken along the line V-V in FIG. 4, and FIG. 5 illustrates a cross section of the plug member 905 corresponding to the cross-sectional view in FIG. 6A. In the following, FIG. 9A, FIG. 10, FIG. 11A, FIG. 12A, FIG. 12C, and FIG. 13 illustrate the cross-sections of the plug member corresponding to the cross-sectional view in FIG. 6A. The up-down direction on the sheet in FIG. 5 and FIG. 6A matches the up-down direction in the gravity direction of the plug member in the liquid housing container 16 when the plug member is detached from the feeding port 106. In the figures illustrating a plug member in an embodiment described later, the directions are similarly matched.

As illustrated in FIG. 5, the plug member 905 includes a main body portion 905C located outside the housing chamber 100 and the feeding port 106 in the state of being mounted to the feeding port 106, and a plug portion 905D to be inserted to the feeding port 106 to close the feeding port 106. The plug member 905 is mounted while being elastically deformed so as to sandwich the feeding port 106 from the up-down direction. The main body portion 905C of the plug member 905 includes a cover portion 905B that covers the opening surface of the feeding port 106, and a protruding portion 905A that protrudes from the upper surface 904 of the cover portion 905B. The protruding portion 905A is a tab portion for a user to grip when detaching the plug member 905 from the feeding port 106. The user pulls the protruding portion 905A to pull the plug member 905 out of the feeding port 106 for opening. Note that, in the following description, the protruding portion is sometimes referred to as "tab portion". As illustrated in FIG. 5, the tab portion 905A is formed so as to protrude from the upper surface 904 of the cover portion 905B that is along the opening surface of the feeding port 106 in the state in which the plug member is mounted to the feeding port.

In the plug member 905 in the comparative example, in the case where the rear surface 907 is a surface substantially horizontal to the opening surface of the feeding port 106, if ink 108 is attached to the rear surface 907, the ink 108 is apt to drop when a user pulls the plug member 905 out of the feeding port 106. Thus, there is a fear that the dropped ink 108 is attached to the finger of the user.

In view of the above, the plug member 105 for sealing the feeding port 106 in the present embodiment includes a main body portion 105C including a tab portion 105A and a cover portion 105B, and a plug portion 105D to be inserted to the feeding port 106 to close the feeding port 106. The tab portion 105A is provided to protrude from the upper surface 104 of the cover portion 105B of the plug member. Note that the upper surface 104 is along the opening surface of the outer opening 106D of the feeding port 106 in the state in which the plug member 105 is mounted to the feeding port 106. The tab portion 105A is provided at a position through which an axis 105CP passing through the center of the plug member 105 in the posture of the liquid housing container 16 when the plug member 105 is detached from the feeding port 106 passes, so as to protrude in the vertical direction from the upper surface 104. Note that the state in which the tab portion 105A "protrudes" refers to a state in which the tab portion 105A protrudes from the upper surface 104 to such a degree that a user can grip the tab portion 105A or apply force to the tab portion 105A.

The axis 105CP of the plug member 105 passes through the center of the plug portion 105E described below as seen from the opening surface of the feeding port 106. As illustrated in FIG. 6A, the feeding port 106 has a substantially tubular protruding portion 106A that protrudes from the outer surface of the container main body 111. The feeding port 106 further has an outer opening 106D that is opened to the outer side of the container main body 111 at the distal end of the protruding portion 106A, an inner opening 106E that is opened in the housing chamber 100, and an inner peripheral surface 106C that connects the outer opening 106D and the inner opening 106E. Note that an opening surface serving as the outer opening 106D of the feeding port 106 and an opening surface serving as the inner opening 106E are an example of the opening surface of the feeding port to which the axis 105CP is orthogonal.

Figure 7:
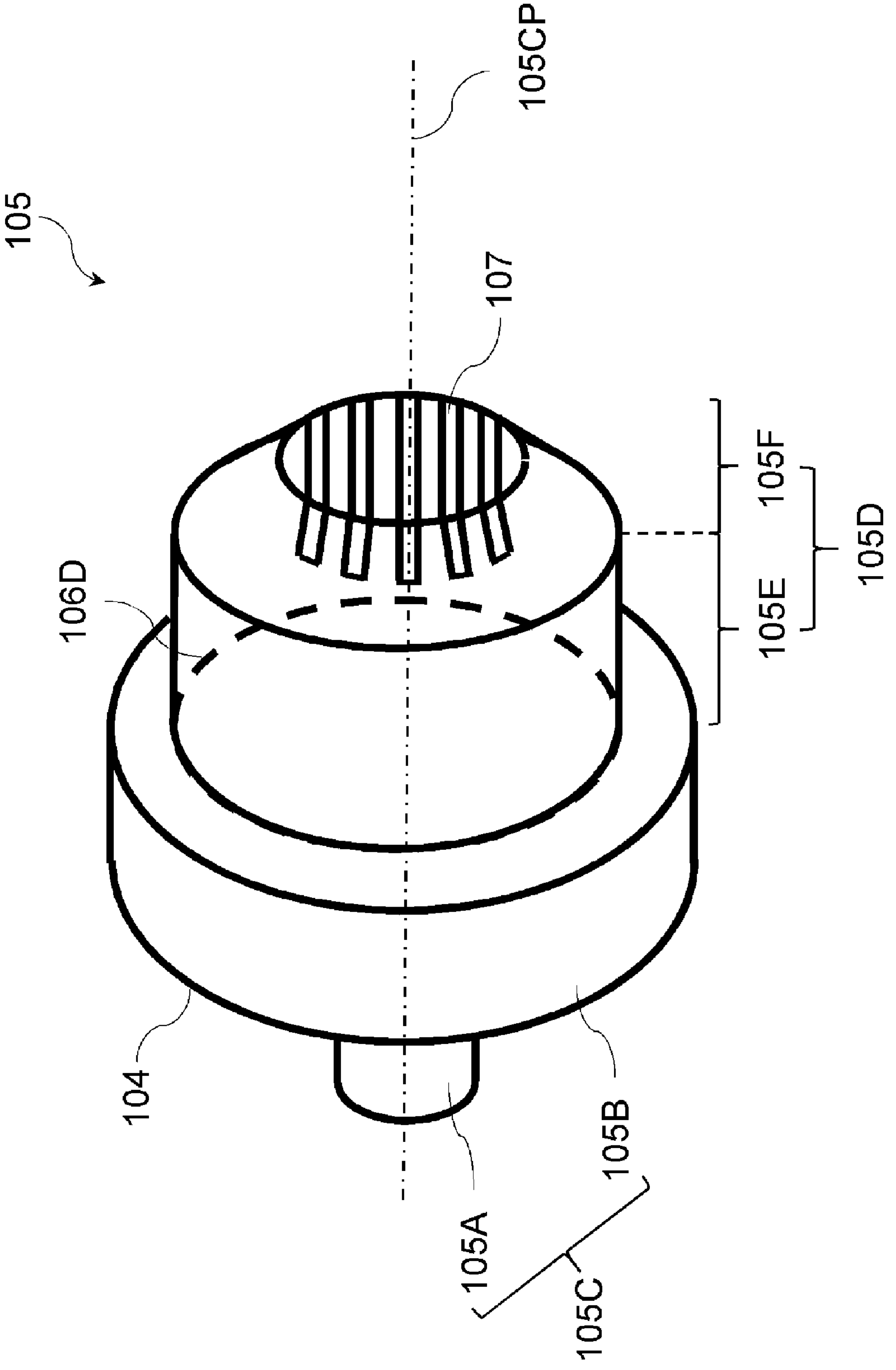
FIG. 7 is a perspective view illustrating an example of the plug member according to the first embodiment.

Referring to FIG. 6A and FIG. 7, the plug member 105 is further described. In a mounting state in which the plug member 105 is mounted to the container main body 111 so as to seal the feeding port 106, the plug member 105 includes a main body portion 105C formed by a tab portion 105A and a cover portion 105B located on the outer side of the housing chamber 100 and the feeding port 106 of the container main body 111. In the mounting state, the plug member 105 includes a plug portion 105D to be inserted to the feeding port 106. As illustrated in FIG. 7, the plug portion 105D is a member having a substantially columnar shape. The plug portion 105D is a member that protrudes from the cover portion 105B to be press-fitted to the feeding port 106. In the state in which the plug portion 105D is mounted to the supply portion 106, the plug portion 105D has a press-fitting portion 105E to be press-fitted to the inner peripheral surface 106C of the feeding port 106 and a distal end portion 105F exposed to the housing chamber 100 on the distal end side of the press-fitting portion 105E.

In the state in which the plug member 105 is mounted to the feeding port 106, the distal end portion 105F of the plug portion 105D protrudes to be below the outer opening 106E of the feeding port 106 (to the housing chamber 100 side). Liquid stored in the housing chamber 100 may be attached to the distal end portion 105F. If the plug portion 505D does not have a configuration for positively removing attached liquid of preventing attached liquid from being scattered like the plug member 505 in the comparative example, liquid attached to the plug member 505 may be scattered to the outside or drops when the plug member 505 is detached.

In view of the above, the plug portion 105D of the plug member 105 in the present embodiment is provided with liquid holding grooves 107 capable of holding attached liquid by capillary force. The liquid holding grooves 107 are provided to extend in a direction parallel to an axis 105CP of the plug member 105 in a posture of the liquid housing container 16 when the plug member 105 is detached from the feeding port 106. Note that the liquid holding groove 107 corresponds to a liquid holding portion capable of holding liquid by capillary force.

The liquid holding grooves 107 in the present embodiment are described with reference to FIG. 6B. FIG. 6B is a top view of the plug member 105 as seen from the plug portion 105D side. Note that the positions of the liquid holding grooves 107 change depending on the direction of viewing, and hence FIG. 6B illustrates an example of the liquid holding grooves 107.

In the present embodiment, the plug portion 105D has a tubular shape. As illustrated in FIG. 6B, in the top view, the liquid holding grooves 107 are a plurality of linear grooves that communicate the circular outer circumference of the plug portion 105D, and the grooves are provided in parallel to one another. Thus, the liquid holding grooves 107 are provided as grooves provided at the distal end surface and the outer peripheral surface of the distal end portion 105F of the plug portion 105D.

A depth d of the liquid holding groove 107 in the direction of the axis 105CP is set to a depth that does not reach the inner opening 106E of the feeding port 106 in the state of being mounted to the feeding port 106 of the plug portion 105 in order to secure sealing properties of the plug portion 105D for the inner peripheral surface 106C of the feeding port 106. As the width w of the liquid holding groove 107 becomes smaller, the capillary force for holding liquid becomes larger. The width w is preferably about 0.1 to 1 mm in consideration of the ease of formation of the liquid holding groove 107.

When liquid adheres to the plug portion 105D, the adhering liquid is held by the liquid holding groove 107 due to the capillary force of the liquid holding groove 107. In this manner, phenomena that liquid attached to the plug portion 105D is scattered to the outside and drops when the plug member 105D is detached from the feeding port 106 can be suppressed.

Note that a preferred depth d and width w of the liquid holding groove 107 for holding liquid by capillary force differ depending on the material of the plug portion 105D, the surface tension of liquid to be attached, liquid density, and a contact angle of liquid for the plug portion 105D, and hence the depth d and the width w can be set as appropriate.

The shape of the liquid holding groove 107 is not limited to the shape illustrated in FIG. 6B. For example, even when the liquid holding groove 107 is a groove formed in a distal end surface or an outer peripheral surface of the distal end portion 105F, liquid can be held. FIG. 8A to FIG. 8E illustrate examples of the shape employed for the liquid holding groove 107. FIG. 8A to FIG. 8E are views corresponding to the top view of the plug member 105 in FIG. 6B. As illustrated in FIG. 8A to FIG. 8E, a shape obtained by freely combining a straight line and/or a curve can be employed for the shape of the liquid holding grooves 107.

Figure 8A:
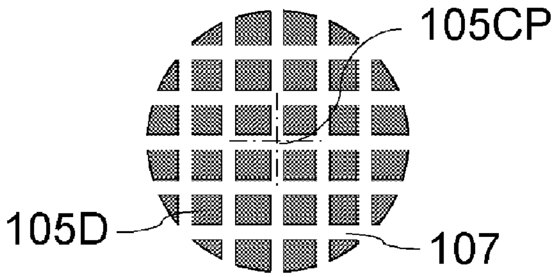
FIG. 8A to FIG. 8E are top views illustrating other examples of the plug member according to the first embodiment.
Figure 8D:
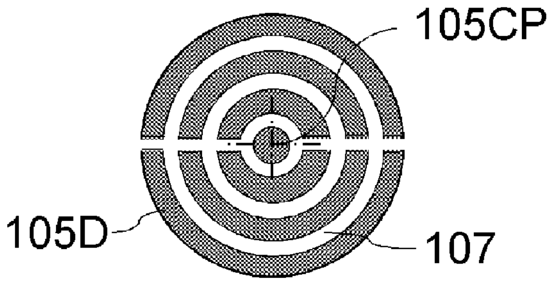
Figure 8B:
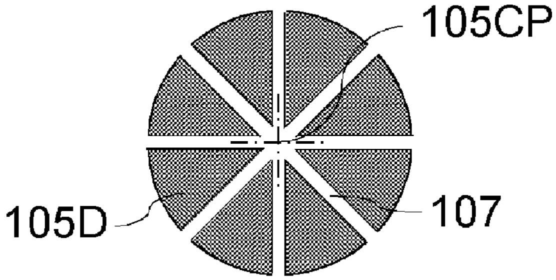
Figure 8E:
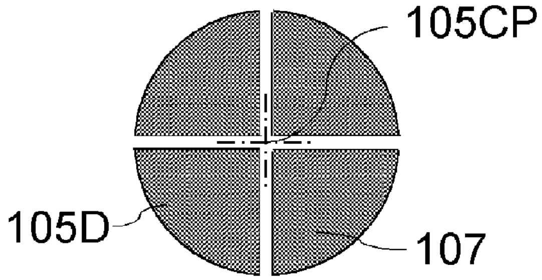
Figure 8C:
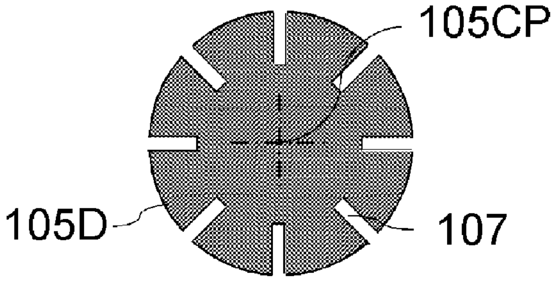

As illustrated in FIG. 8A and FIG. 8B, the amount of liquid that can be held by the liquid holding groove 107 becomes larger as the number of liquid holding grooves 107 becomes larger, and the scattering and dropping of liquid adhering to the plug portion 105D can be suppressed more. However, the molding of the plug portion 105D becomes more complicated as the number of liquid holding grooves 107 becomes larger. Thus, in view of the ease of molding of the plug portion 105D, as illustrated in FIG. 8C to FIG. 8E, in the top view of the plug portion 105D, liquid holding grooves 107 may be provided as grooves having a shape extending radially, a circular shape, and/or a cross shape.

Figure 9A:
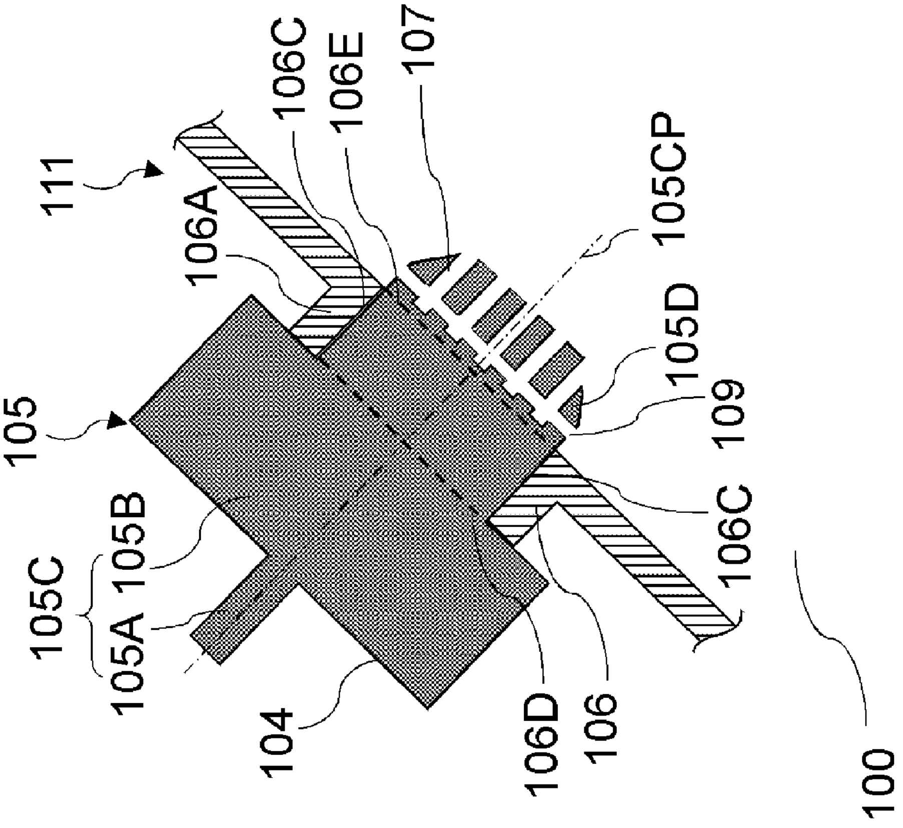
FIG. 9A is a cross-sectional view illustrating another example of the plug member according to the first embodiment.
Figure 9B:
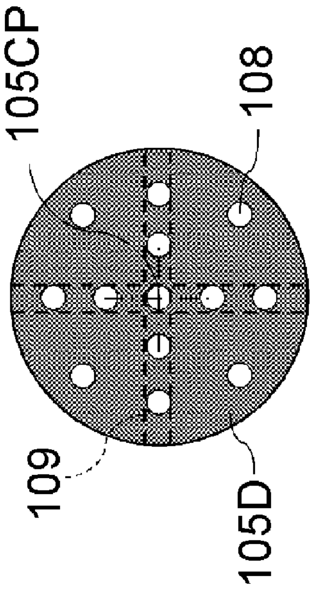
FIG. 9B is a top view illustrating another example of the plug member according to the first embodiment.

To obtain the effect of holding liquid by capillary force, the groove shape is suited for the shape of the liquid holding groove 107. However, the shape of the liquid holding groove 107 is not limited to the groove shape, and as illustrated in FIG. 9A and FIG. 9B, even when holes 108 extending in parallel to the axis 105CP are provided instead of the liquid holding grooves 107, the effect of holding liquid can be obtained by the holes 108. Note that, in the case were the hole 108 is provided, if liquid held by the hole 108 closes the hole 108, the capillary force due to the hole 108 cannot be obtained in some cases. Thus, when the holes 108 are provided in the distal end portion 105F, as illustrated in FIG. 8A, it is preferred to provide a communication hole 109 that communicates to the holes 108 in the distal end portion 105F.

The above-mentioned various liquid holding grooves 107 can be formed by injection molding. In the case of the plug member 105 exemplified in FIG. 9A and FIG. 9B, after the holes 108 are formed by injection molding, the communication hole 109 can be formed by additional processing. Note that the liquid holding groove 107, the hole 108, and the communication hole 109 described above may be combined as appropriate to form the plug member 105.

Figure 10:
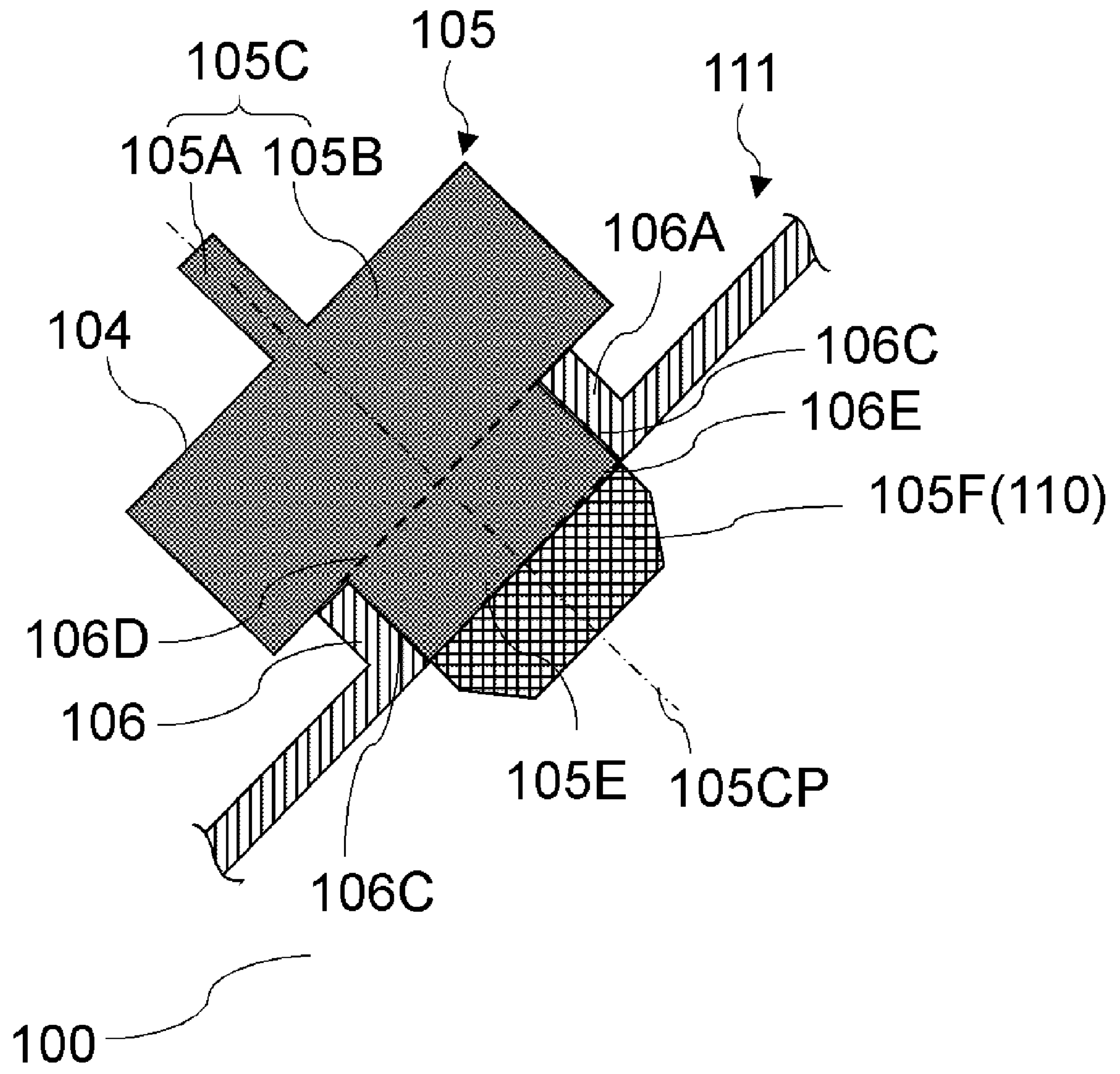
FIG. 10 is a cross-sectional view illustrating another example of the plug member according to the first embodiment.

Furthermore, as illustrated in FIG. 10, in the state in which the plug member 105 is mounted to the feeding port 106, instead of providing the liquid holding grooves 107 at the distal end portion 105F of the feeding port 106, the distal end portion 105F may be formed by a porous material 110. In this manner, liquid attached to the distal end portion 105F penetrates through the porous material 110, and hence the scattering and dropping of liquid when the plug member 105 is detached from the feeding port 106 can be suppressed. As the porous material 110, for example, a member that facilitates the penetration of liquid, such as urethane sponge and fiber assembly, can be employed.

Note that a location where the plug member 105 detached from the feeding port 106 is placed when the housing chamber 100 is replenished with liquid may be provided to the container main body 111 or the liquid ejection device 200. Furthermore, a liquid absorbing member that contacts the distal end portion 105F of the plug member 105 may be disposed at the location where the plug member 105 is placed. For the liquid absorbing member, the same member as the above-mentioned porous material 110 can be employed. In this manner, liquid held by the liquid holding groove 107 and the porous material 110 at the distal end portion 105F is absorbed by the liquid absorbing member, and hence the performance of the liquid holding groove 107 and the porous material 110 for holding liquid can be maintained for a longer time.

Second Embodiment

Figure 11B:
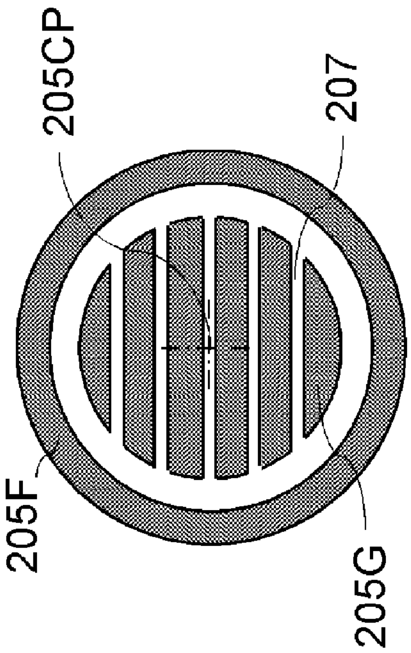
FIG. 11B is a top view illustrating an example of the plug member according to the second embodiment.
Figure 11A:
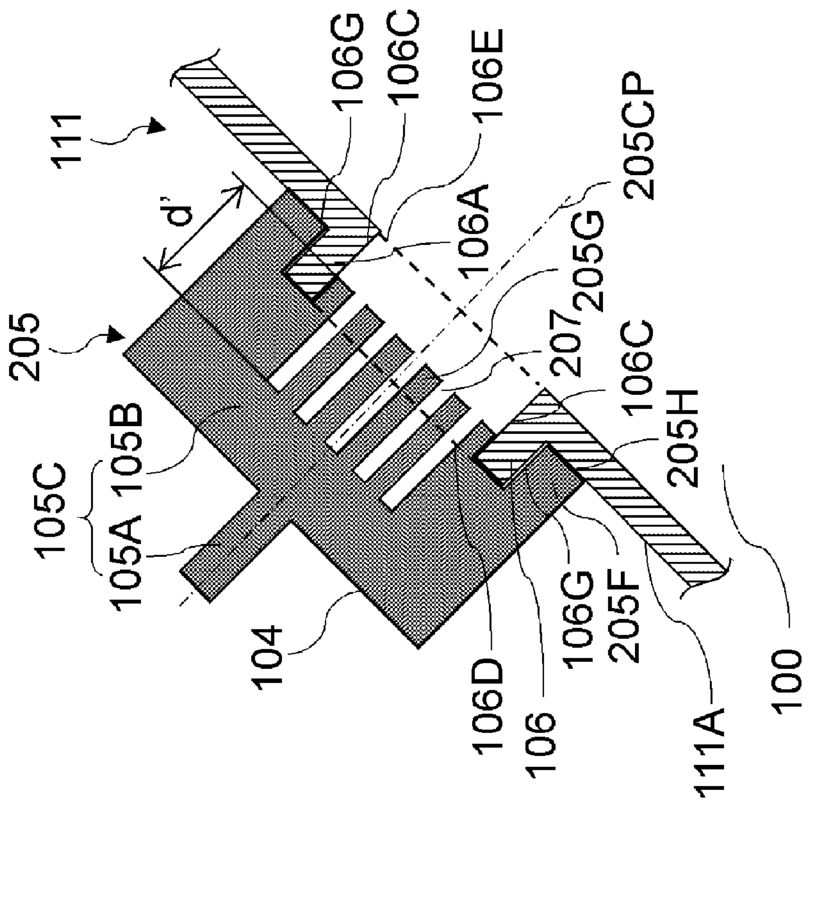
FIG. 11A is a cross-sectional view illustrating an example of a plug member according to a second embodiment.

Next, a second embodiment of the present invention is described. Note that, in the following description, the same configurations as in the first or second embodiment are denoted by the same reference symbols, and detailed descriptions thereof are omitted. FIG. 11A and FIG. 11B are views illustrating an example of a plug member 205 in the present embodiment. FIG. 11A illustrates a state in which the plug member 205 is mounted to a feeding port 106. FIG. 11B is a top view of the plug member 205 as seen from a protruded portion 205G described below. Note that FIG. 11B corresponds to the top views in FIG. 6B, FIG. 8A to FIG. 8E, and FIG. 9B.

In the state in which the plug member 205 is mounted to the supply portion 106, the plug member 205 is press-fitted to the inner peripheral surface 106C of the feeding port 106. Thus, in order to secure sealing properties for preventing liquid leakage between the plug member 205 and the feeding port 106, the plug member 205 is formed by a flexible member such as rubber.

The main body portion 105C includes a tab portion 105A, a cover portion 105B, and a sealing portion 205F that covers the outer peripheral surface 106G of the feeding port 106. The sealing portion 205F is a substantially tubular member that is provided so as to protrude from the outer circumference of the cover portion 105B and that is fitted on the outer peripheral surface 106G of the protruding portion 106A of the feeding port 106. The main body portion 105C has a protruded portion 205G that is press-fitted to the inner peripheral surface 106C of the feeding port 106. The protruded portion 205G protrudes from the cover portion 105B and is inserted to the feeding port 106 from the outer opening 106 of the feeding port 106. In the cross-sectional view in FIG. 11A, the sealing portion 205F protrudes in a direction of the axis 205CP of the plug member 205 with respect to the protruded portion 205G. In the state in which the plug member 205 is mounted to the feeding port 106, the distal end surface 205H of the sealing portion 205F contacts the inclined surface 111A of the container main body 111.

The protruded portion 205G to be inserted to the feeding port 106 protrudes from the cover portion 105B in the same direction as the sealing portion 205F. The protruding length of the sealing portion 205F is longer than the protruding length of the protruded portion 205G. Thus, the sealing portion 205F protrudes with respect to the protruded portion 205G in the direction in which the plug member 205 is inserted to the feeding port 106. The protruded portion 205G is provided with a liquid holding groove 207 with a depth d' that does not reach the upper surface 104 of the main body portion 105C.

In the state in which the plug member 205 is mounted to the feeding port 106, the protruded portion 205G does not protrude to the housing chamber 100 side with respect to the inner opening 106E of the feeding port 106. Thus, as compared to the plug member 505 in the comparative example, the possibility that liquid in the housing chamber 100 is attached to the plug member 205 (protruded portion 205G) is reduced. Even when liquid has been attached to the protruded portion 205G, the liquid is held by capillary force of the liquid holding grooves 207, and a phenomenon that the liquid is scattered or drops when the plug member 205 is detached from the feeding port 106 can be suppressed. The protruding length of the protruded portion 205G is shorter than the protruding length of the sealing portion 205F, and hence as compared to the plug member 505 in the comparative example, the possibility that the protruded portion 205G, which is a part to which liquid may be attached, and another member of a finger of a user contact after the plug member 205 is detached from the feeding port 106 is low. In this manner, due to the plug member 205 in the present embodiment, the effect of preventing liquid attached to the plug member 205 from contaminating the hand of a user can also be expected.

While the embodiment according to the disclosed technology has been described above, the description of the above-mentioned embodiment is illustrative for describing the disclosed technology. The disclosed technology can be implemented by changing or combining the embodiment in addition to the following modifications as appropriate within the range not departing from the gist of the invention. Modifications of the above-mentioned embodiment are described below. Note that, in the following description, the same configurations as in the above-mentioned embodiment are denoted by the same reference symbols, and detailed descriptions thereof are omitted.

First Modification

Figure 12A:
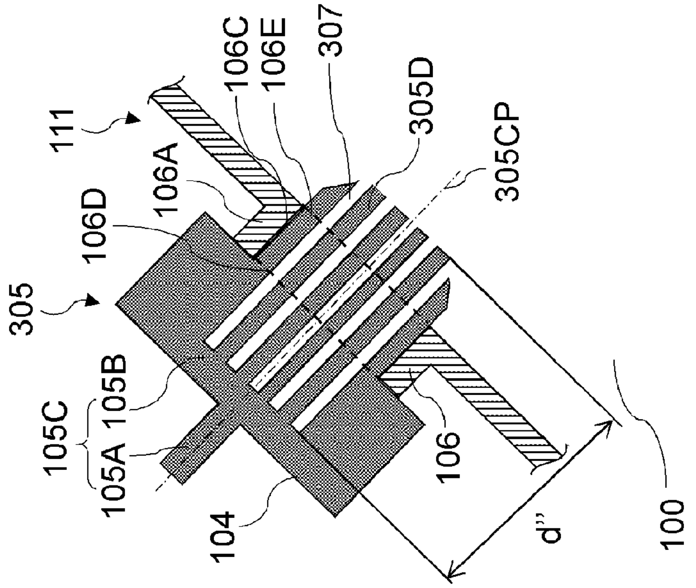
FIG. 12A and FIG. 12C are cross-sectional views illustrating a plug member according to one modification.
Figure 12B:
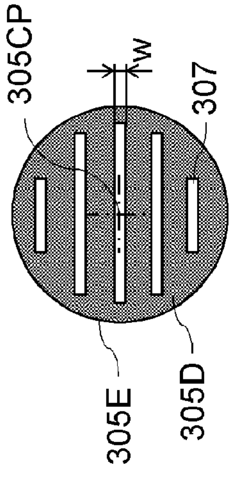
FIG. 12B is a top view illustrating the plug member according to one modification.
Figure 12C:
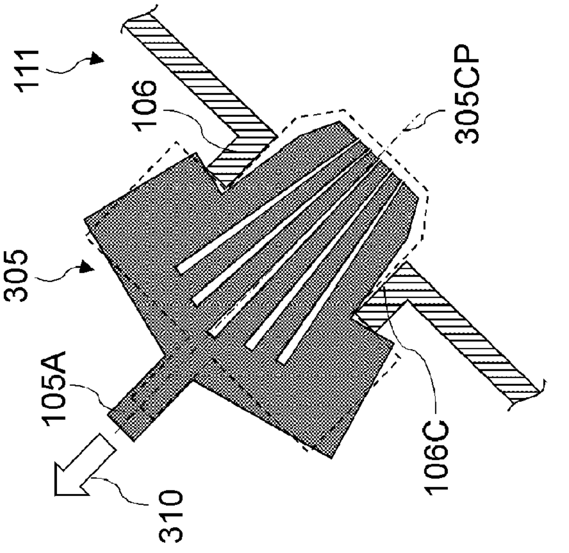

Referring to FIG. 12A to FIG. 12C, one modification is described. FIG. 12A is a cross-sectional view of a plug member 305 and a container main body 111 according to the present modification. FIG. 12B is a top view of the plug member 305 as seen from a plug portion 305D. Note that the positions of the liquid holding grooves 307 change depending on the direction of viewing, and hence FIG. 12B illustrates an example of the liquid holding grooves 307.

As illustrated in FIG. 12A, the plug member 305 includes a main body portion 105C configured by a tab portion 105A and a cover portion 105B, and a plug portion 305D to be inserted to the feeding port 106. The plug portion 305D is provided with liquid holding grooves 307 corresponding to the liquid holding grooves 107 in the state of being mounted to the in which the feeding port 106 of the plug member 305.

An axis 305CP of the plug member 305 passes through the center of plug portion 305D as seen from an opening surface of the feeding port 106. A depth d" of the liquid holding groove 307 in the direction of the axis 305CP is set to a depth that reaches the inside of the cover portion 105B beyond the outer opening 106D of the feeding port 106 and does not reach the upper surface 104 in the state of being mounted to the feeding port 106 of the plug member 305. Thus, the depth d" of the liquid holding groove 307 is longer than the depths d and d' of the liquid holding grooves 107 and 207 in the above-mentioned embodiment. In this manner, the amount of liquid that can be held by the liquid holding groove 307 is larger than the amounts of liquid that can be held by the liquid holding grooves 107 and 207, so that the scattering and dropping of liquid attached to the plug portion 305D can be more suppressed when the plug member 305 is detached from the feeding port 106. Note that a width w of the liquid holding groove 307 may be the same as the widths w of the liquid holding grooves 107 and 207.

As illustrated in FIG. 12C, when a user pulls the tab portion 105A in a direction of an arrow 310 to pull the plug member 305 out of the feeding port 106 in order to detach the plug member 305 from the feeding port 106, the main body portion 105A and the plug portion 305D are deformed toward the inner side (axis 305CP). In this case, the liquid holding groove 307 is deformed with respect to the cover portion 105B and the plug portion 305D such that the groove is closed against friction force caused between the plug portion 305D and the feeding port 106. Since the plug member 305 is configured in this manner, the friction force between the plug portion 305D and the inner peripheral surface 106C of the feeding port 106 is decreased to obtain the effect of facilitating the detachment of the plug member 305 can also be expected.

Furthermore, as illustrated in FIG. 12B, in the top view of the plug member 305, the liquid holding grooves 307 are formed so as not to communicate to the outer circumference 305E of the plug portion 305D. If the liquid holding grooves 307 are configured so as to communicate to the outer circumference 305E of the plug portion 305D similarly to FIG. 6B, liquid may travel through the liquid holding groove 307, the plug portion 305D, and a gap between the main body portion 105C and the feeding port 106 to leak out to the outside of the liquid housing container 16. Thus, sealing properties of the plug portion 305D for the feeding port 106 may be impaired. In the present modification, however, the liquid holding groove 307 has a groove shape that does not communicate to the outer circumference 305E of the plug portion 305D, and hence the sealing properties of the plug portion 305D for the feeding port 106 can be secured.

Accordingly, the present modification can also implement a liquid housing container capable of preventing leakage of liquid from the liquid housing container and preventing liquid from being scattered and a human hand from being dirtied when a plug member is detached from a feeding port, and a liquid ejection device including the liquid housing container.

Second Modification

Figure 13:
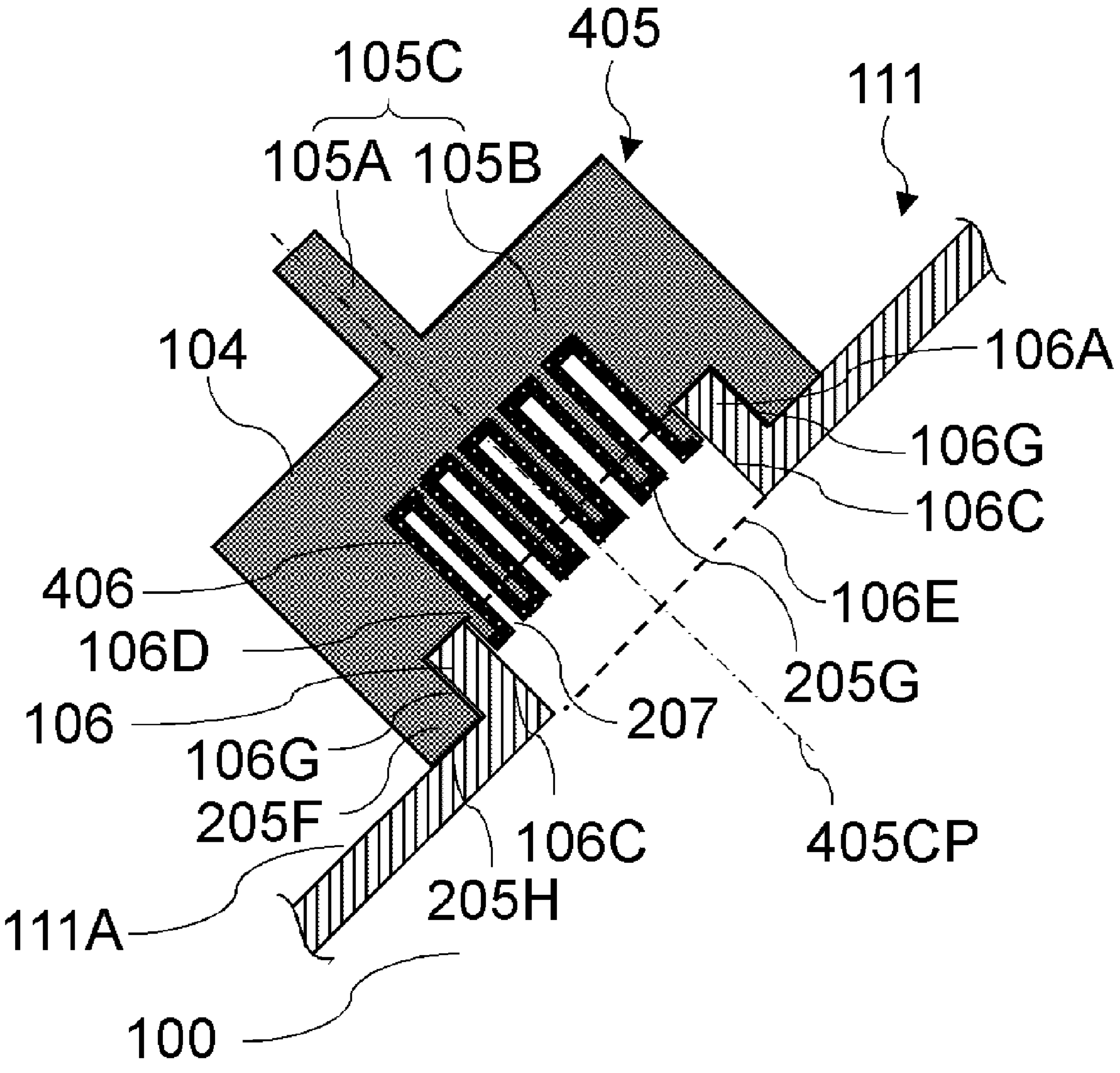
FIG. 13 is a cross-sectional view illustrating another plug member according to one modification.

Next, another modification is described with reference to FIG. 13. FIG. 13 is a cross-sectional view of a plug member 405 and a container main body 111 according to the present modification.

The plug member 405 is provided with a hydrophilic layer 306 obtained by performing hydrophilic treatment on the surfaces of the protruded portion 205G and the liquid holding groove 207. Note that, in the present modification, it is assumed that the hydrophilic treatment used to form the hydrophilic layer 306 is surface modification by atmospheric plasma. However, as long as the hydrophilic layer 306 can be formed, a method for using an appropriate chemical solution to provide hydrophilic property to the surfaces of the protruded portion 205G and the liquid holding groove 207 may be employed. The material of the plug member 305 may be subjected to hydrophilic treatment. In this manner, the effect of holding liquid by the liquid holding grooves 207 is obtained due to the hydrophilicity of the plug member 305 itself, and similarly to the above-mentioned plug member, the scattering and dropping of liquid when the plug member 405 is detached from the feeding port 106 can be suppressed.

According to the disclosed technology, a liquid housing container capable of suppressing a possibility that liquid is scattered from a liquid housing container and a possibility that liquid on a plug member is attached to a human hand and a liquid ejection device including the liquid housing container can be provided.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076057, filed on Apr. 28, 2021, which is hereby incorporated by reference herein in its entirety.

What is claimed is:

1. A liquid housing container for supplying liquid to a liquid ejection head, comprising:

a container main body including a housing chamber for housing liquid therein; and a feeding port for feeding the liquid to the housing chamber; and a plug member that is attachable to and detachable from the container main body and seals the feeding port, the plug member including a cover portion for covering the feeding port from an outer side of the container main body in a mounting state, in which the plug member is mounted to the container main body, and a protruded portion that protrudes from the cover portion to an inner side of the feeding port, wherein the protruded portion includes a groove that is provided at a position including a distal end surface of the protruded portion and is capable of holding the liquid by capillary force.

2. The liquid housing container according to claim 1, wherein the protruded portion includes a press-fitted portion that is press-fitted to the feeding port, and a distal end portion exposed to the housing chamber on a distal end side of the press-fitted portion, and the distal end portion includes the groove.

3. The liquid housing container according to claim 1, wherein the plug member includes a plurality of grooves provided in the distal end surface of the protruded portion, and the plurality of grooves are capable of holding the liquid by capillary force, the plurality of grooves have a depth reaching inside of the cover portion, and when the plug member in the mounting state is pulled out of the feeding port, the cover portion and the protruded portion are deformed to close the plurality of grooves conforming to friction force caused between the protruded portion and the feeding port.

4. The liquid housing container according to claim 1, wherein the feeding port is formed of:

a substantially tubular protruding portion that protrudes from an outer surface of the container main body;

an outer opening that is opened to an outer side of the container main body at a distal end of the protruding portion;

an inner opening that is opened in the housing chamber; and an inner peripheral surface that connects the outer opening and the inner opening, the cover portion covers the outer opening from the outer side of the container main body in the mounting state in which the plug member is mounted to the container main body, the protruded portion protrudes from the cover portion and is inserted to the feeding port from the outer opening, and the plug member includes a substantially tubular sealing portion that protrudes from the cover portion and is fitted on an outer peripheral surface of the protruding portion.

5. The liquid housing container according to claim 4, wherein the sealing portion protrudes further than the protruded portion in a direction in which the plug member is inserted to the feeding port.

6. The liquid housing container according to claim 1, wherein the groove is provided in an outer peripheral surface of the protruded portion.

7. The liquid housing container according to claim 1, wherein a hole is provided in the distal end surface of the protruded portion.

8. The liquid housing container according to claim 1, wherein the protruded portion has a distal end surface that has been subjected to hydrophilic treatment.

9. A liquid ejection device, comprising:

the liquid ejection head according to claim 1 for ejecting liquid; and the liquid housing container according to claim 1.

10. The liquid ejection device according to claim 9, comprising a device main body having the liquid housing container incorporated therein.

11. The liquid ejection device according to claim 10, wherein, in a state in which the liquid housing container is incorporated in the device main body, the plug member is detached from the feeding port to enable liquid to be supplied from the feeding port to the housing chamber.

12. The liquid housing container according to claim 1, wherein a width of the groove is 0.1 to 1 millimeter.

13. The liquid housing container according to claim 1, wherein the groove is provided in an outer peripheral surface of the protruded portion.

14. The liquid housing container according to claim 1, wherein the groove extends across a face of the distal end surface of the protruded portion.

15. A liquid housing container for supplying liquid to a liquid ejection head, comprising:

a container main body including a housing chamber for housing liquid therein; and a feeding port for feeding the liquid to the housing chamber; and a plug member that is attachable to and detachable from the container main body and seals the feeding port, the plug member including a cover portion for covering the feeding port from an outer side of the container main body in a mounting state, in which the plug member is mounted to the container main body, and a protruded portion that protrudes from the cover portion to an inner side of the feeding port, wherein the protruded portion includes a liquid holding portion that formed of porous material and provided at a position including a distal end surface of the protruded portion and is capable of holding the liquid by capillary force.

16. A liquid housing container for supplying liquid to a liquid ejection head, comprising:

a container main body including a housing chamber for housing liquid therein; and a feeding port for feeding the liquid to the housing chamber; and a plug member that is attachable to and detachable from the container main body and seals the feeding port, the plug member including a cover portion for covering the feeding port from an outer side of the container main body in a mounting state, in which the plug member is mounted to the container main body, and a protruded portion that protrudes from the cover portion to an inner side of the feeding port, wherein the protruded portion includes a liquid holding portion including a distal end surface of the protruded portion and is capable of holding the liquid by capillary force, and wherein the distal end surface has been subjected to hydrophilic treatment.

* * * * *